J. H. AYERS.
COTTON CHOPPER.
APPLICATION FILED JUNE 27, 1911.
1,021,228. Patented Mar. 26, 1912.
2 SHEETS—SHEET 2.
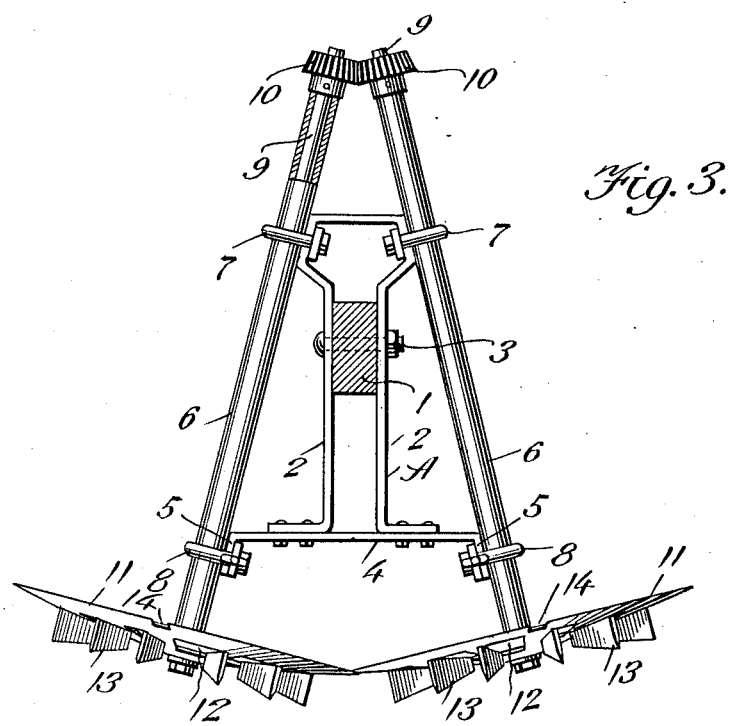
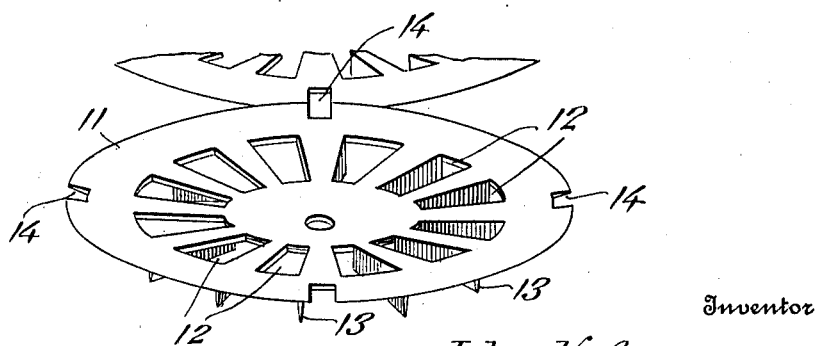
Inventor
John H. Ayers

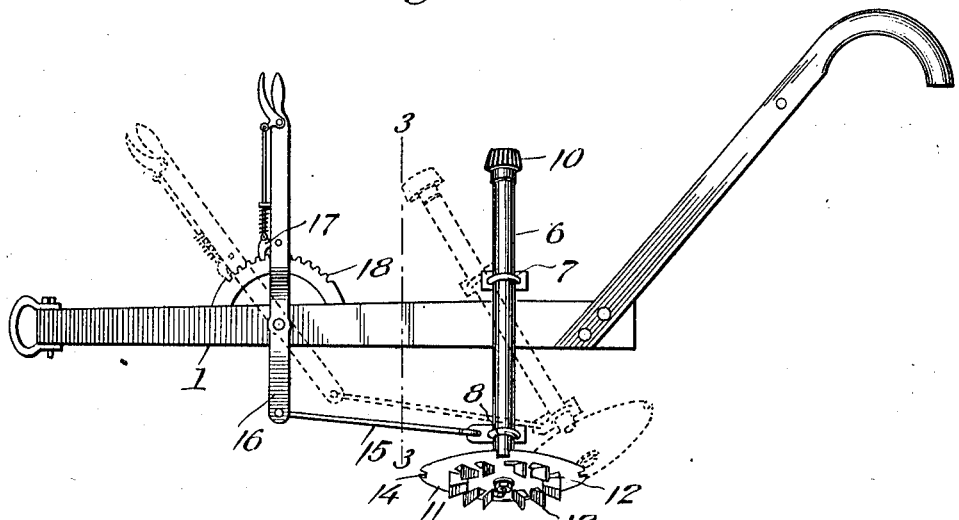

UNITED STATES PATENT OFFICE.

JOHN H. AYERS, OF COMMERCE, GEORGIA.

COTTON-CHOPPER.

1,021,228.  Specification of Letters Patent.  Patented Mar. 26, 1912.

Application filed June 27, 1911. Serial No. 635,527.

*To all whom it may concern:*

Be it known that I, JOHN H. AYERS, a citizen of the United States, residing at Commerce, in the county of Jackson and State of Georgia, have invented new and useful Improvements in Cotton-Choppers, of which the following is a specification.

This invention relates to cotton choppers, and it has particular reference to that class of cotton choppers in which a pair of ground engaging disks supported for rotation in inclined planes adjacent to the opposite sides of the row of plants that is to be operated upon are provided with overlapped engaging edges that serve to cut the superfluous plants from the ground and with interengaging notches alining with each other so as to preserve stands of plants at the desired intervals.

The present invention has for its principal object to provide a simple and improved construction whereby the earth engaging disks shall be mounted for rotation in a frame which is tiltably connected with a draft beam.

A further object of the invention is to simplify and improve the construction of the disks.

Still further objects of the invention are to simplify and improve the general construction and operation of a device of the class described.

With these and other ends in view which will readily appear as the nature of the invention is better understood, the same consists in the improved construction and novel arrangement and combination of parts which will be hereinafter fully described and particularly pointed out in the claim.

In the accompanying drawings has been illustrated a simple and preferred form of the invention, it being, however, understood that no limitation is necessarily made to the precise structural details therein exhibited, but that changes, alterations and modifications within the scope of the claim may be resorted to when desired.

In the drawings,—Figure 1 is a side elevation of a machine constructed in accordance with the invention, dotted lines being employed to show the tilting disk carrying frame in a different position. Fig. 2 is a top plan view. Fig. 3 is a transverse sectional view taken in front of the tilting disk carrying frame and looking in a rearward direction, said section being laid on the line 3—3 in Fig. 1. Fig. 4 is a perspective detail view of one of the disks and a portion of the other disk of the improved machine.

Corresponding parts in the several figures are denoted by like characters of reference.

The improved machine comprises a beam 1 which is straddled by a yoke A, the limbs or side members of which, 2, 2, are pivotally connected with the beam 1 by means of a transverse bolt or pivotal member 3. The lower ends of the limbs 2 are bolted upon or otherwise associated with a cross bar 4, the ends of which are provided with downturned lugs 5. The yoke A and the cross bar 4 combine to constitute a tilting frame with which a pair of tubular bearing members 6, 6 are connected by means of clips 7 and 8, said tubular bearing members being inclined so as to converge upwardly, the upper portions of said bearing members being connected by the clips 7 with the crown of the yoke A, while the lower ends of the bearing members 6 are connected by the clips 8 with the lugs 5 of the cross bar 4.

Supported for rotation in the tubular bearing members 6, 6 are shafts 9, 9, the upper ends of which are provided with intermeshing bevel gears 10. The lower ends of the shafts 9 carry the earth engaging dished disks 11 which are so disposed that the edge of one of said disks shall be slightly overlapped by the edge of the proximate disk. Said disks are provided with radial slots 12, the material struck out in the formation of said slots being downturned to form earth engaging flanges 13. The disks 11 are also provided at their peripheral edges with notches 14 which are so disposed that the notches of the two disks shall register with each other when the disks rotate, certainty of operation being insured by the intermeshing bevel gears at the upper ends of the disk carrying shafts 9.

The lower end of the frame formed by the yoke A, the cross bar 4 and associated parts is connected by means of links 15 with the lower end of a bifurcated lever 16 fulcrumed upon the beam 1, the upwardly extending arm of said lever being provided with a stop member 17 engaging a segment rack 18 upon the beam 1.

It will be seen that by manipulating the lever 16, the frame supporting the disk carrying shafts may be tilted to various positions, thus causing the disks which ride upon the surface of the ground to engage the ground at various inclinations.

In practice, the machine straddles the row of plants that is to be operated upon, and the interengaging disks will chop out the superfluous plants, leaving stands at proper intervals which will be determined by the location of the peripheral notches 14 in the disks. The downturned flanges 13 will engage the ground and cause the disks to be rotated positively and without danger of slipping, and the dirt, weeds and waste material will escape through the slots 12, being thus prevented from accumulating upon the surface of the disks and interfering with the free rotation of the latter. It will also be seen that the earth engaging flanges 13 will serve to stir and loosen the dirt, thereby preparing the soil for the reception and retention of moisture and thus promoting the successful growth of the crop.

Having thus described the invention, what is claimed as new, is:—

In a cotton chopper, a beam, a frame pivoted upon said beam, said frame including a yoke straddling the beam and a cross bar connected with the lower ends of the side members of said yoke, upwardly converging inclined bearing members associated with said frame, shafts supported for rotation in the bearing members and having intermeshing bevel gears at their upper ends, earth engaging chopping disks at the lower ends of the shafts, and means for tilting the frame and for supporting it at various adjustments, said means including a lever pivoted upon the frame and having a stop member, a rack segment engaged by said stop member, and a link connecting the lever with the tiltable frame.

In testimony whereof I affix my signature in presence of two witnesses.

JOHN H. AYERS.

Witnesses:
A. C. LITTLE,
S. E. BAILEY.

---

Copies of this patent may be obtained for five cents each, by addressing the "Commissioner of Patents, Washington, D. C."